May 27, 1941.  R. J. ERNST  2,243,274
CHAIN CONVEYER
Filed March 8, 1940

INVENTOR.
Robert J. Ernst
BY Edward M. Apple
ATTORNEY.

UNITED STATES PATENT OFFICE 2,243,274

CHAIN CONVEYER

Robert J. Ernst, Ann Arbor, Mich., assignor, by mesne assignments, to Cherry-Burrell Corporation, Chicago, Ill., a corporation of Delaware Application March 8, 1940, Serial No. 322,878

10 Claims. (Cl. 198—189)

This invention relates to endless chain conveyers and more particularly to that type of chain conveyers, used for carrying milk containers and the like.

An object of the invention is to generally improve chain conveyers and to provide a device which has many advantages over similar devices now known to the public.

Another object of the invention is to provide a chain which is so constructed that it permits small radius turns, whereby considerable saving of space is effected with its use on vertical and horizontal curves.

A further object of the invention is to provide a chain having links which are substantially flat on the bottom, which flat surfaces set up friction against the drive sprocket and effect a caterpillar type drive.

Another object of the invention is the provision of a chain made of links which have integral means formed thereon which permit changes of elevation to be made in track level.

A chain constructed as herein taught permits the assembling and replacement of individual links with the minimum of time and effort and prevents the accidental displacement of the links. It is proposed to form the chain links by forging, so that exactness of curvature may be obtained on all contacting parts. This permits full surface contact between the parts, thereby reducing the strain per unit area, and prolonging the working life of the units by providing efficient lubricating surfaces. Such a construction approaches a ball and socket fit between the links.

A forged link such as herein disclosed is light, has greater tensile strength and may be readily heat treated and case hardened. The improved chain construction has other advantages, for example, there is a close fit providing a concentric bearing between the trailing edge of one link and the leading edge of an adjacent link, which permits each link to push the link immediately in front of it, without causing the links to elevate and unlock.

Another advantage of my improved construction resides in the fact that the contiguous portions of the several links are so shaped and arranged that there is a comparatively wide and continuous, substantially unbroken top plane surface for the smooth delivery and transfer of containers resting thereon. This arrangement also provides sufficient slippage beneath the containers so that there is no danger of damaging containers such as fibre boxes and the like.

A still further advantage of the invention is the provision of wings on opposite sides of the links, which are arranged above the center line of force and are adapted to cooperate with elements on the conveyer stand or track, to prevent the chain from rotating on its longitudinal axis.

The foregoing objects and advantages, and others will be more readily understood as the description proceeds, reference being made, from time to time, to the accompanying drawing, in which.

Figure 1:
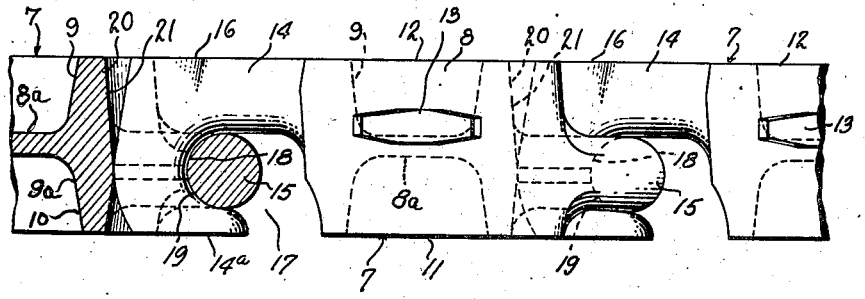
Fig. 1 is a fragmentary view, partly in section, of a conveyer chain embodying the invention.
Figure 2:
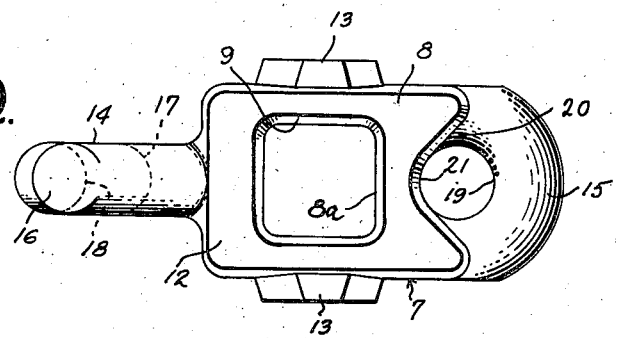
Fig. 2 is a top plan view of one of the improved links.
Figure 3:
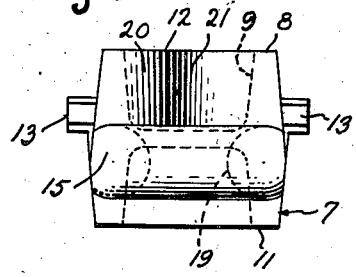
Fig. 3 is a rear elevation of the link shown in Fig. 2.
Figure 5:
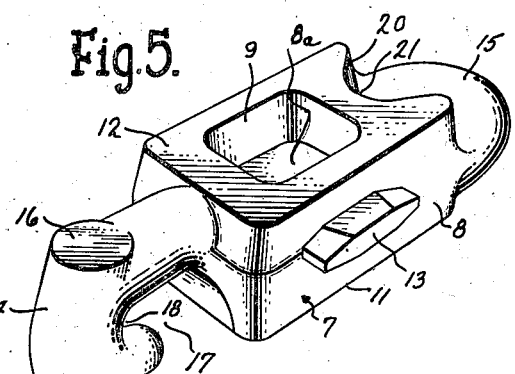
Fig. 5 is a perspective view of the link shown in Fig. 2.
Figure 4:
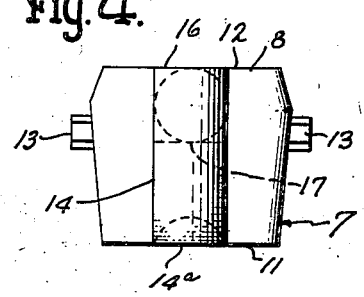
Fig. 4 is a front elevation of the link shown in Fig. 2.

Referring now more particularly to the drawing, it will be understood that in the embodiment herein disclosed the reference character 7 indicates generally the link embodying the invention. The link 7 consists of a substantially rectangular body member 8, which is provided with a centrally disposed horizontal reinforcing web 8a, which defines the central openings 9 and 9a, the latter having angular walls 10, adapted to engage the teeth of drive sprockets (not shown). The bottom surface 11 of the link body 8 is substantially flat so that it rides directly on the body of the drive sprocket (not shown), causing a frictional contact which results in a caterpillar type driving action.

The upper surface 12 of the link body is also flat to provide an effective delivery and transfer surface for containers, such as barrels, drums, cans, cartons and the like, resting thereon. The link body 8 is provided at either side with wings 13, which are positioned above the center line of force and are adapted to cooperate with means carried on the conveyer frame (not shown) to prevent the chain from rotating on its longitudinal axis while in use.

The link body 8 terminates at the front in a hook 14 and at the rear in a ring 15 which elements are of such size and shape that the elements of one link cooperate with the elements of adjacent links to form a chain as shown in Fig. 1.

The hook 14 has a top surface 16 which is in the same plane with the top surface 12 of the link body and serves the same purpose. The bottom surface 14a of the hook 14 is in the same plane with the surface 11 of the body. The openings 17 of the hooks are shaped and arranged so that the links have to be angularly disposed to one another before the hook of one can engage the ring of the other. The inside of the hook 14 is provided with a radius 18 which is the same as the outer radius of the periphery of a cross section of ring 15 so that there is a close working surface contact between the hook 14 and the ring 15. By the same token the outer periphery of the hook 14 is made to engage the walls of the opening 19 in the ring 15 whereby a close working surface contact is effected. These several working surface contacts between hook 14 and ring 15 resemble in effect the action of a ball and socket joint.

The link body 8 is provided with a beveled cut back, as at 20, there being an arc formed as at 21, and arranged to provide a further working surface contact between the links (Fig. 1), so that each link may push the link immediately in front of it even when the links are rocked angularly from the position shown in Fig. 1. It will be noted that this working surface contact is in the plane of the center line of force of the chain so that the links will not be elevated or displaced when pushed. Such contact between the work surfaces, as represented by the beveled face 20 of the arcuate surface 21, is made possible by the complementary arcuate surface on the adjacent front face of the hook 14 connected through the ring 15, all as clearly shown in Fig. 1.

It should also be noted that the ends of the arcuate surface 20 are formed by rearward extensions of the walls of the body portion of the ring. These rearward extensions form what may be considered in substance a dovetail connection with the hook of an adjacent link which is passed through the ring 15 which is overlapped along two sides by the rearward extensions of the walls of the body portion, as referred to above. The continuation of the plane top surface of the body portion of the link along the tops of the extensions of the walls of the body of the link, as just referred to, and the plane surface on the upper face of the hook 14 constitutes one of the important novel features of the instant invention by providing a substantially continuous plane surface formed by the tops of the body portions of adjacent links and the dovetail extensions of such body portions, all as clearly shown in Fig. 1 of the drawing.

The invention has been described in its preferred embodiment. Various modifications of the invention may be readily apparent to those skilled in the art without departing from the spirit of the invention or the applied claims.

The invention is hereby claimed as follows:

1. In a conveyer, a chain comprising a plurality of links, each having a substantially deep hollow rectangular body terminating at one end in a hook and at the other end in a ring, there being one or more arcs formed on the link body at the ring end thereof, said arcs being in alignment with the opening in said ring, and said arcs being arranged to engage corresponding arcs on the outer periphery of the hook of an adjacent link to provide substantial surface contacts when the hook and ring of adjacent links are rocked vertically.

2. A chain link comprising a body portion having a central opening adapted to engage the tooth of a sprocket, a hook at one end of said body, a ring at the opposite end of said body, plane surfaces on the top and bottom of said body and said hook, and a wing on each side of said body portion, said wings being positioned above the center line of force of said hook and said ring.

3. In a conveyer, a chain comprising a plurality of links, each having a substantially hollow rectangular body terminating, at one end in a hook and at the other in a ring, there being a horizontally disposed reinforcing web extending through the hollow rectangular body.

4. A chain link comprising a substantially deep body portion having a central opening with angular walls adapted to engage the teeth of a sprocket, a downwardly projecting hook at one end of said body, a laterally disposed ring at the opposite end of said body, and arcs formed at the end of said body above and below said ring, said arcs being adapted to provide a substantial surface contact between the body of said link and the hook of an adjacent link when the adjacent links are angularly disposed to one another.

5. A chain link comprising a body portion having a central opening with angular walls adapted to engage the teeth of a sprocket, a downwardly projecting hook at one end of said body portion, said hook having an inwardly projecting portion adapted to prevent the upward displacement of said hook, a laterally disposed ring at the opposite end of said body, said ring having a circular cross-section and a central opening adapted throughout its inner periphery to engage the outer periphery of the hook of an adjacent line to provide a substantial surface contact.

6. A chain link comprising a body portion having an opening adapted to engage the tooth of a sprocket, a hook at one end of said body portion, a ring at the opposite end of said body portion, plane surfaces on the top and bottom of said body portion and said hook, and longitudinal extensions of the sides of said body portion to overlap said ring and forming continuations of the plane surface on the top of said body portion, said extensions on one link and the hook of an adjacent link forming a substantially dovetail connection.

7. A chain link comprising a body portion having an opening adapted to engage the tooth of a sprocket, a hook at one end of said body portion, a ring at the opposite end of said body portion, plane surfaces on the top and bottom of said body portion and said hook, and longitudinal extensions of the sides of said body portion to overlap said ring and forming continuations of the plane surface on the top of said body portion, said extensions on one link forming with the dovetail hook of an adjacent link a continuation of said plane surface on the top of the body portion of the adjacent links.

8. A chain link comprising a body portion having means for engaging the tooth of a sprocket, a downwardly projecting hook at one end of said body portion, a laterally disposed ring at the opposite end of said body portion, arcuate surfaces formed in said body portion adjacent to said ring above and below said ring, and outwardly beveled walls defining said arcuate surfaces.

9. A chain link comprising a body portion having means for engaging the tooth of a sprocket, a downwardly projecting hook at one end of said body portion, a laterally disposed ring at the opposite end of said body portion, arcuate surfaces formed in said body portion adjacent to said ring above and below said ring, and outwardly beveled walls defining said arcuate surfaces, said outwardly beveled walls joining in a plane passing through the horizontal diameter of a vertical cross section of said ring.

10. A chain link comprising a body portion having means for engaging the tooth of a sprocket, a downwardly projecting hook at one end of said body portion, a laterally disposed ring at the opposite end of said body portion, arcuate surfaces formed in said body portion adjacent to said ring above and below said ring, outwardly beveled walls defining said arcuate surfaces, and complementary beveled surfaces on the front end of said hook, whereby the contact between the beveled surface of a hook on one link and the adjacent beveled walls of the arcuate surface of an adjacent link is substantially maintained in a plane passing through the mid-section of said ring.

ROBERT J. ERNST.

CERTIFICATE OF CORRECTION.

Patent No. 2,243,274.   May 27, 1941.

ROBERT J. ERNST.

It is hereby certified that error appears in the printed specification of the above numbered patent requiring correction as follows: Page 2, first column, line 6, for the words "outer radius of the periphery" read --radius of the outer periphery--; same page, second column, line 31, claim 5, for "line" read --link--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.